(12) United States Patent
Morgan et al.

(10) Patent No.: US 8,881,758 B2
(45) Date of Patent: Nov. 11, 2014

(54) HIGH-PRESSURE VALVE

(71) Applicants: Christopher Kim Morgan, Pearland, TX (US); Eric Richard Lewis, Baton Rouge, LA (US); Michael Wayne Ackman, Zachary, LA (US)

(72) Inventors: Christopher Kim Morgan, Pearland, TX (US); Eric Richard Lewis, Baton Rouge, LA (US); Michael Wayne Ackman, Zachary, LA (US)

(73) Assignee: ExxonMobil Chemical Patent Inc., Houston, TX (US)

( * ) Notice: Subject to any disclaimer, the term of this patent is extended or adjusted under 35 U.S.C. 154(b) by 0 days.

(21) Appl. No.: 13/724,545

(22) Filed: Dec. 21, 2012

(65) Prior Publication Data

US 2013/0112281 A1    May 9, 2013

Related U.S. Application Data

(62) Division of application No. 12/024,543, filed on Feb. 1, 2008, now Pat. No. 8,360,095.

(51) Int. Cl.
*F16K 17/04* (2006.01)
*F16K 17/02* (2006.01)
*F16K 1/38* (2006.01)
*F16K 1/42* (2006.01)
*F16K 1/54* (2006.01)

(52) U.S. Cl.
CPC ............... *F16K 17/02* (2013.01); *F16K 1/385* (2013.01); *F16K 1/42* (2013.01); *F16K 1/54* (2013.01)
USPC .......................................... 137/477; 417/300

(58) Field of Classification Search
USPC .......................... 137/475–478, 497; 417/300
See application file for complete search history.

(56) References Cited

U.S. PATENT DOCUMENTS

| 455,476 | A | * | 7/1891 | Scott | 137/478 |
|---|---|---|---|---|---|
| 1,471,229 | A | | 10/1923 | Williston | |
| 2,046,228 | A | | 6/1936 | Wiedmann et al. | |
| 2,372,631 | A | | 3/1945 | Stevenson et al. | |
| 2,431,769 | A | | 12/1947 | Parker | |
| 2,517,562 | A | * | 8/1950 | Hanson | 137/478 |
| 2,517,858 | A | * | 8/1950 | Farris | 137/469 |
| 2,547,862 | A | * | 4/1951 | Gilmore | 137/478 |
| 2,661,016 | A | | 12/1953 | Leffler | |
| 2,792,846 | A | | 5/1957 | Grieshaber et al. | |

(Continued)

FOREIGN PATENT DOCUMENTS

| CN | 1809422 | 7/2006 |
|---|---|---|
| DE | 887 897 | 8/1953 |

(Continued)

*Primary Examiner* — John Fox
(74) *Attorney, Agent, or Firm* — Chad Guice; Leandro Arechederra, III

(57) ABSTRACT

Disclosed in one aspect is a valve comprising (a) a valve body having a poppet valve chamber with an axis running there through; (b) a seat having a seat sealing surface, and a outer-seat surface, the seat located axially within the poppet valve chamber; and (c) a poppet having a poppet sealing surface, the poppet being located axially within the poppet valve chamber; wherein a poppet-seat interface is created between at least a portion of the seat sealing surface and at least a portion of the poppet sealing surface, the poppet-seat interface being at an angle β of from 20 to 90° to the axis. In one embodiment the seat is removable, allowing the geometry of at least the poppet head surface and/or the seat inside surface, which defines a fluid flow-path cross-section, to be tailored.

10 Claims, 6 Drawing Sheets

(56) References Cited

U.S. PATENT DOCUMENTS

| | | | |
|---|---|---|---|
| 2,827,075 A | 3/1958 | Mercier | |
| 2,832,372 A * | 4/1958 | Farris | 137/528 |
| 2,880,751 A * | 4/1959 | Tobis et al. | 137/478 |
| 3,199,532 A | 8/1965 | Trick | |
| 3,208,473 A | 9/1965 | Budzich et al. | |
| 3,610,276 A | 10/1971 | Seelman et al. | |
| 3,710,824 A | 1/1973 | Lohbauer | |
| 4,253,484 A | 3/1981 | Danon et al. | |
| 4,276,901 A | 7/1981 | Lyons | |
| 4,292,990 A | 10/1981 | Pareja | |
| 4,343,601 A | 8/1982 | Thorson | |
| 4,447,040 A | 5/1984 | Magorien | |
| 4,597,410 A | 7/1986 | Wilke | |
| 5,037,277 A | 8/1991 | Tan | |
| 5,226,799 A | 7/1993 | Raghavan et al. | |
| 5,743,291 A | 4/1998 | Nehm et al. | |
| 6,173,912 B1 | 1/2001 | Gottlieb et al. | |
| 6,494,229 B2 | 12/2002 | Kajitani | |
| 6,832,619 B1 | 12/2004 | Walsh | |
| 6,837,267 B2 | 1/2005 | Weis et al. | |
| 7,210,460 B2 * | 5/2007 | Douyama et al. | 123/457 |
| 7,225,831 B2 * | 6/2007 | Hope et al. | 137/516.27 |

FOREIGN PATENT DOCUMENTS

| | | |
|---|---|---|
| DE | 43 16 486 | 10/1994 |
| FR | 2 225 667 | 11/1974 |
| FR | 2 430 566 | 2/1980 |

\* cited by examiner

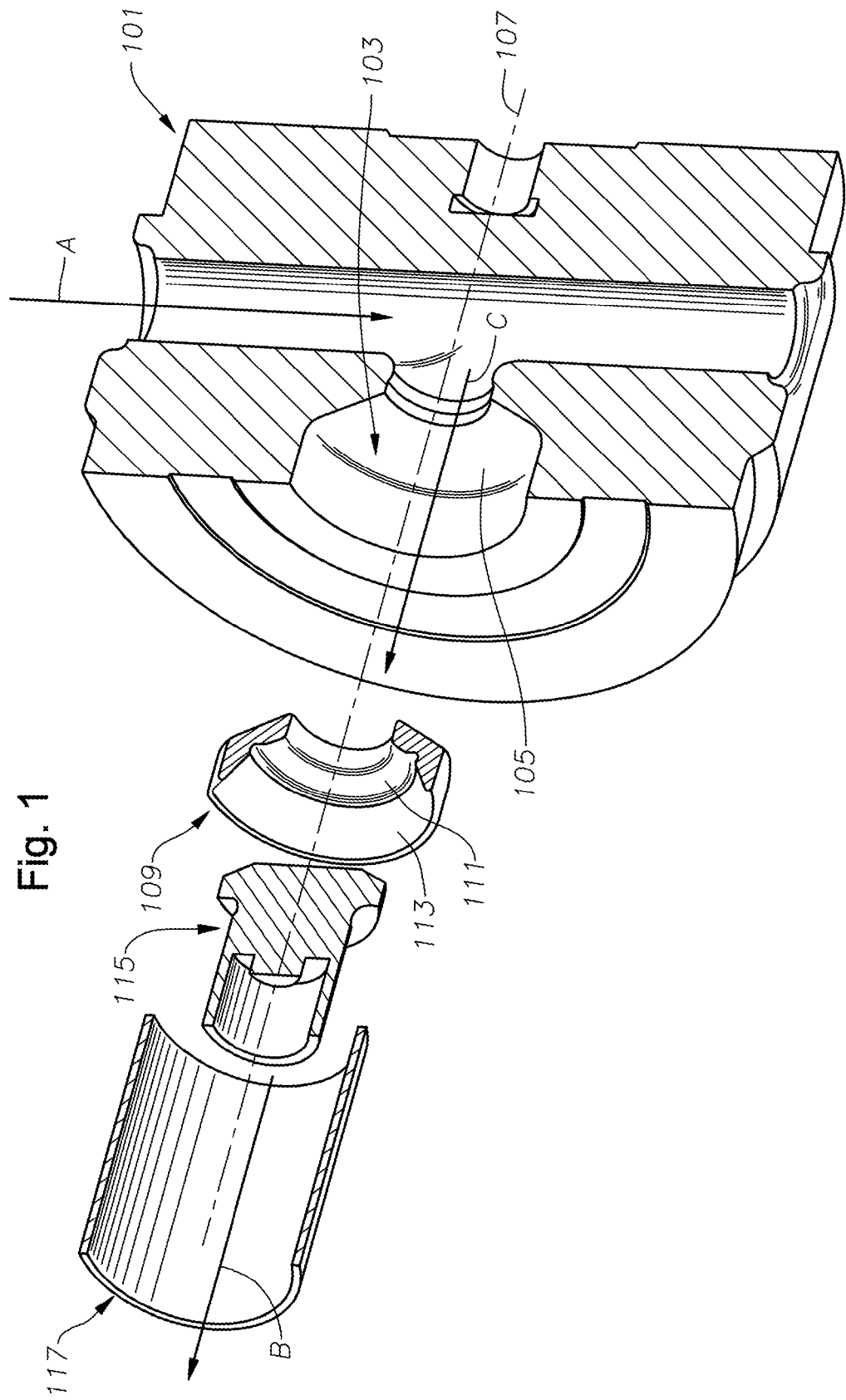

HIGH-PRESSURE VALVE

CROSS-REFERENCE TO RELATED APPLICATIONS

The present application is a divisional of co-pending U.S. patent application Ser. No. 12/024,543, filed Feb. 1, 2008, and entitled "High-Pressure Valve," the disclosure of which is hereby incorporated by reference herein.

FIELD OF THE INVENTION

The present invention relates in general to a valve useful for fluid channeling, and more particularly to poppet valves comprising a seat that creates a flow restriction zone to maintain adequate operation of the valve when traveling between the closed and the open position.

BACKGROUND OF THE INVENTION

High pressure ethylene compression, especially at pressures of between 130 MPa and 350 MPa, is commonly employed in high pressure polyethylene production. So called "hypercompressors" are used to achieve such high pressures, the fluid ethylene becoming a "supercritical fluid" at such pressures. Poppet valves are commonly used on such hypercompressors. The hypercompressor reliability is typically the largest source of unreliability in the high pressure polymerization unit. In particular, the poppet valve life is one of the largest sources of unreliability of the hypercompressor. This unreliability is mainly due to wear of the poppet valves.

Furthermore, and perhaps leading to such high unreliability, hypercompressor valve poppets often do not open and close during operation as desired. The forces that are created by the supercritical fluid flow through the valve act upon the poppet during operation which causes the poppet to behave undesirably. The force which causes the undesirable behavior is an axial force created by a local low pressure zone between the seat and poppet sealing surfaces. Increasing the flow rate also increases the closing force on the poppet so that the poppet does not move to the open position with increasing flow rate.

What is needed is a means by which high pressure polymerization processes can be run more reliably with less down time and less expense in replacing poppet valves in the hypercompressor. The inventors have solved this and other problems in the design of a novel seat, preferably a replaceable seat, with a radial restriction between the poppet and the seat which is incorporated into a typical poppet valve design. The radial restriction is a novel concept to enable the poppet position during operation to be a function of the fluid flow conditions through the valve. This solves the problem of unwanted poppet behavior due to the forces created by fluid flow between the poppet and seat sealing surfaces. The replaceable feature enables the introduction of the seat with the novel radial restriction profile in existing valve bodies, and simplified replacement of the valve.

SUMMARY OF THE INVENTION

In one aspect is a valve comprising (a) a valve body having a poppet valve chamber and an axis running there through; (b) a seat having a seat inside surface, the seat located within the poppet valve chamber; and (c) a poppet having a poppet head surface, the poppet being located within the poppet valve chamber and capable of making contact with at least a portion of the seat inside surface; and (d) a velocity increasing means to provide a local high velocity zone adjacent to at least a portion of the poppet head surface and at least a portion of the seat inside surface.

In another aspect is a valve comprising (a) a valve body having a poppet valve chamber with an axis running there through; (b) a seat having a seat sealing surface, and a outer-seat surface, the seat located coaxially within the poppet valve chamber; and (c) a poppet having a poppet sealing surface, the poppet being located coaxially within the poppet valve chamber; wherein a poppet-seat interface is created between at least a portion of the seat sealing surface and at least a portion of the poppet sealing surface, the poppet-seat interface being at an angle $\beta$ of from 20 to 90° to the axis.

In another aspect is a hypercompressor valve comprising (a) a valve body having a poppet valve chamber with an axis running there through; (b) a seat having a seat inside surface and a outer-seat surface, the seat located coaxially within the poppet valve chamber; and (c) a poppet having a poppet head surface, the poppet being located coaxially within the poppet valve chamber; wherein the seat is replaceable.

In yet another aspect is a process of channeling (or diverting) a fluid comprising (a) providing a valve body having a poppet valve chamber with axis running there through; (b) providing a seat having a seat sealing surface, the seat located co-axially within the poppet valve chamber; and (c) providing a poppet having a poppet sealing surface, the poppet being located coaxially within the poppet valve chamber; wherein the valve has an open position and a closed position, and wherein a flow restriction zone is created adjacent to at least a portion of the poppet sealing surface in the range of poppet travel between the closed position and the open position such that fluid flowing through the valve chamber and past the poppet in the open position creates a local high fluid velocity zone.

In yet another aspect is an olefin polymerization process comprising providing one or more compressors comprising one or more valves comprising (a) a valve body having a poppet valve chamber with axis running there through; (b) a seat having a seat sealing surface, the seat located co-axially within the poppet valve chamber; and (c) a poppet having a poppet sealing surface, the poppet being located coaxially within the poppet valve chamber; wherein the valve has an open position and a closed position, and wherein a flow restriction zone is created adjacent to at least a portion of the poppet sealing surface in the range of poppet travel between the closed position and the open position such that fluid olefin flowing through the valve chamber and past the poppet in the open position creates a local high fluid velocity zone.

As will be understood, the various features of these and other aspects of the invention can be combined with the various embodiments of the invention as described herein.

BRIEF DESCRIPTION OF THE DRAWINGS

FIG. 1 shows a cross-section of one embodiment of the inventive valve from the downstream perspective, the individual parts separated to show details;

DETAILED DESCRIPTION OF THE INVENTION

Figure 2A:
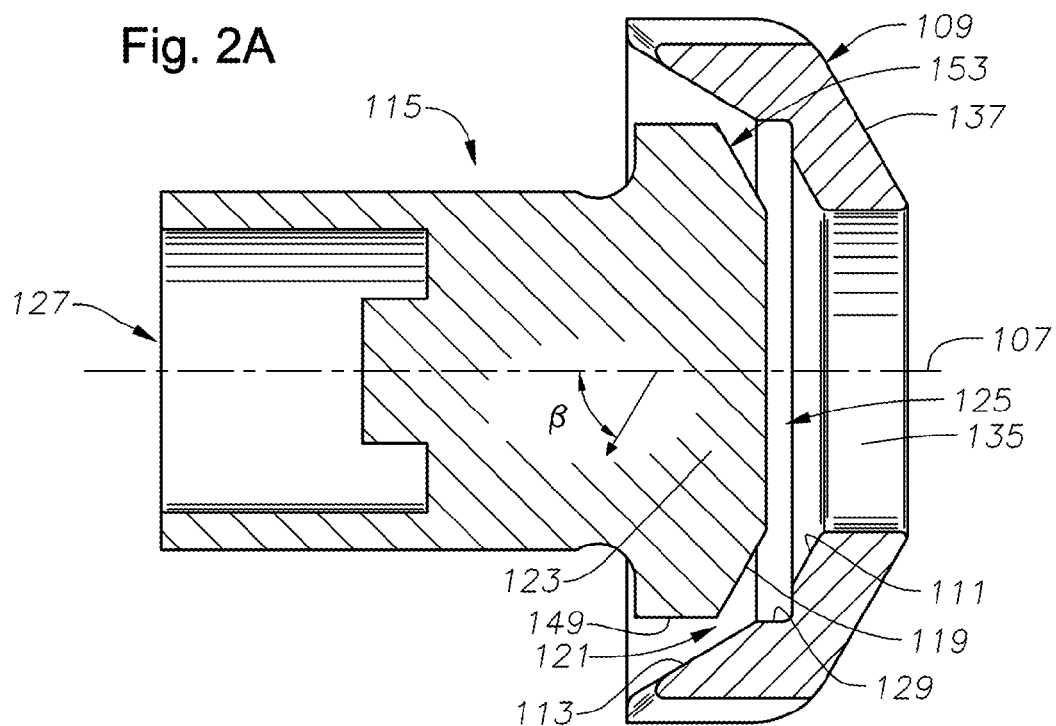
FIG. 2a shows a close-up cross-section of the poppet in its open position relative to the seat of the valve.
Figure 2B:
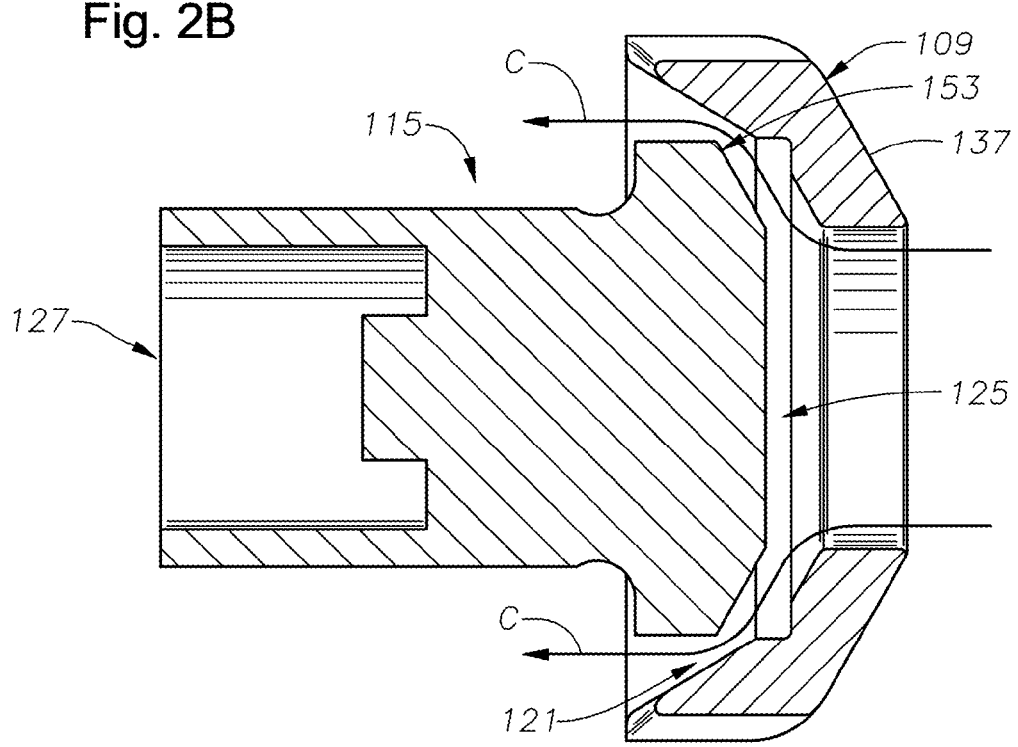
FIG. 2b shows a close-up cross-section of the poppet in its open position relative to the seat of the valve, and highlighting the flow of fluid through the valve.

An aspect of the invention is directed to a valve, more particularly a valve for use in high pressure devices such as a compressor, and most particularly a hypercompressor valve for use in a high pressure polymerization reactor containing supercritical fluids. The valve is a poppet valve in one embodiment and comprises a seat that creates a flow restriction of the operating fluid at and around the outside diameter of the head of the poppet as the fluid flows adjacent to the seat, and in a particular embodiment, between the seat and the poppet. Each of the seat and poppet have at least one corresponding mating surface that creates a seal in the closed configuration of the valve. In the open configuration—any point between completely closed and up to and including fully open—there is at least one surface on each of the seat and poppet whose profile creates the flow restriction, altering the velocity of fluid as it passes through the open valve. This flow restriction, axisymmetric flow restriction zone in one embodiment, is slightly more of a restriction than the restriction created between the poppet head and inside valve surface alone. The radial flow restriction creates a local high fluid velocity zone, which creates a greater difference in pressure between the upstream and downstream sides of the poppet. In addition, the local low pressure zone that normally exists between the poppet and inside valve surface (without the added seat) is disrupted. Since the restriction is radial (at the outside diameter of the poppet), the fluid forces on the poppet from this restriction are radially balanced.

Stated another way, in one embodiment of the invention is a velocity increasing means that provides a local high fluid velocity zone at least between the poppet head surface (located on the poppet) and the seat inside surface (located on the seat). The poppet head surface and seat inside surface face one another in a preferred embodiment. The result is a poppet that increases in lift (more open) as the flow rate of fluids increases.

More particularly, described herein is a valve comprising a valve body having a poppet valve chamber; a seat having a seat inside surface, the seat located within the poppet valve chamber; and a poppet having a poppet head surface, the poppet being located within the poppet valve chamber and capable of making contact with at least a portion of the seat inside surface; and further comprising a velocity increasing means to provide a local high fluid velocity zone at least adjacent to the poppet sealing surface and the seat sealing surface. In one embodiment, the velocity increasing means comprises a "flow restriction zone" defined by the profile of the seat inside surface and the poppet head surface. These surfaces can take on any profile, the profile only limited in design in its capacity to create the flow restriction zone: a local high fluid velocity zone created by the movement of fluid through the flow restriction. In the closed position of the valve, the poppet head surface and seat inside surface create a seal that stops fluid flow there through.

Advantageously, the geometry that creates the flow restriction—the profile of the poppet head surface relative to the profile of the seat inside surface—is such that it is a variable restriction; in one embodiment the movement of the poppet itself as it opens and closes along the axis of symmetry changes the velocity within the flow restriction. The profile of the radial restriction that is formed adjacent to the seat is such that the amount of restriction changes as the poppet moves in the range of poppet travel between the closed position and the fully open position. Thus, the poppet position is dependent upon the flow rate of fluid through the valve and the amount of restriction between the poppet head and seat. The profile of the radial restriction can be manipulated to achieve the desired poppet position at a given fluid flow rate. In particular, the radial restriction is manipulated by adjusting the geometry, (angle and/or surface area and/or diameter) of the seat inside surface and poppet head surface.

In certain embodiments, the seat is removable. A replaceable seat is introduced to the valve to enable the addition or adjustment of the radial restriction without having to purchase new valve bodies. By "replaceable," what is meant is that the seat is not affixed within the valve, as by welding, bolting, adhesive bonding or any other means. The replaceable seat is novel in that it possesses a conical sealing surface that seals against the inner valve body surface which distributes the stress in the valve body resulting from the contact force in a way to minimize stress concentration and enhance fatigue life. An additional feature of the replaceable seat is that refurbishment of the whole valve for reuse is simplified by replacing the seat (the wear item) instead of machining a deeper seat profile in the valve body. This feature greatly increases the number of times a valve body can be reused. Thus, the replaceable seat design decreases maintenance cost.

One embodiment of the invention will be described with respect to the FIGS. 1-5. First referring to FIG. 1 is a valve body 101 having at least one poppet valve chamber 103. Contained and seated within the poppet valve chamber 103 is a seat 109, preferably located and seated against valve inside surface 105. In one embodiment, the valve inside surface 105 is conical in shape, mating with the outer-seat surface 137 and creating a fluid seal when the poppet is in the closed position, as in FIG. 2c. In a preferred embodiment, the seat 109 is replaceable.

Figure 4:
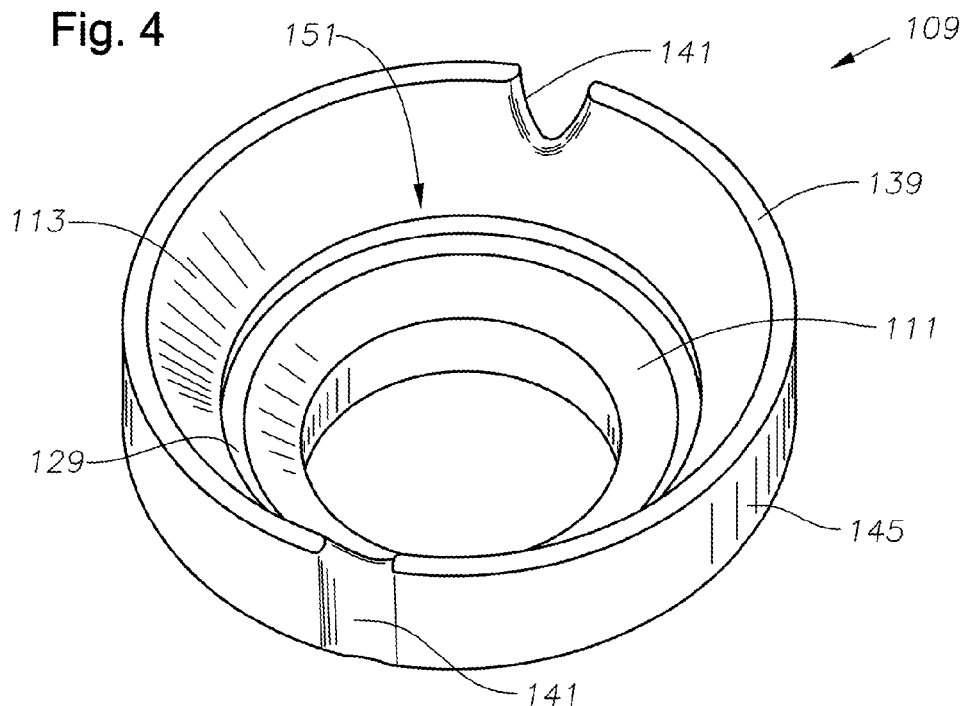
FIG. 4 highlights the details of the seat, which is removable in one embodiment.

For ease of reference, the poppet valve chamber 103 is referenced as possessing an axis 107 which forms an axis of symmetry through the cylindrically-shaped chamber 103. The poppet is located coaxially within the poppet valve chamber 103. The seat 109 comprises a seat inside surface 151 (FIG. 4). The seat inside surface is preferably axisymmetric about the seat, and in one embodiment comprises at least one seat sealing surface 111 and at least one flow restriction surface 113. In a preferred embodiment, there is only one seat sealing surface 111 and one flow restriction surface 113. In one embodiment, the seat 109 comprises a seat sealing surface 111 and a flow restriction surface 113 (FIGS. 1 and 4) that are distinct from one another, meaning that they each may have a different angle or shape relative to axis 107 and/or one another. At least one surface, the seat sealing surface 111 in a preferred embodiment, forms a fluid seal with the poppet when the poppet is in the closed position as in FIG. 2c.

The poppet 115 comprises a poppet head surface 153, preferably axisymmetric about the poppet. The poppet head surface comprises a poppet sealing surface 119 and a second poppet surface 149 in a particular embodiment. In one embodiment, the poppet 115 comprises a poppet sealing surface 119 and a second poppet surface 149 that are distinct from one another, meaning that they each may have a different angle or shape relative to axis 107 (FIG. 2) and/or each other. In one embodiment, the seat sealing surface 111 faces the poppet 115 having a poppet sealing surface 119. In one embodiment, the poppet sealing surface 119 forms a fluid seal with the seat, preferably with the seat sealing surface 111, when the poppet is in the closed position as in FIG. 2c.

The poppet sealing surface 119 makes at least partial contact, discontinuous around the circumference in one embodiment, and continuous contact in another embodiment, with at least the seat sealing surface 111 such that when the valve is in a closed position a poppet-seat interface 143 (FIG. 2c) is created. Upon opening (the poppet travels upward or away from orifice 135), a flow restriction zone 121 is created generally between the seat inside surface 151 and the poppet head surface 153. In the embodiment in FIGS. 1-5, the restriction is created by the intersection of poppet sealing surface 119 and the second poppet surface 149, those surfaces being at distinct angles from one another relative to the axis 107, thus creating a "pinch" point or narrowed zone between the seat and poppet. Fluid rushing past the poppet is then "pinched", which generates a high fluid velocity zone. This high fluid velocity zone can be manipulated by the geometry (cross-sectional shape) of the flow restriction zone, which in turn is adjusted by the design of at least the flow restriction surface 113, the poppet sealing surface 119, or the second poppet surface 149, or a combination of each.

The valve and its components can be made using any material (e.g., metal, alloy, ceramic, combination thereof) that can withstand the working pressures of a hypercompressor. The components of the valve assembly are made from high strength steel or ceramic in one embodiment, preferably high strength steel. In certain embodiments, the valve body is made of high strength steel, and the seat, compression sleeve and poppet are made of ceramic or high strength steel, preferably high strength steel.

Figure 2C:
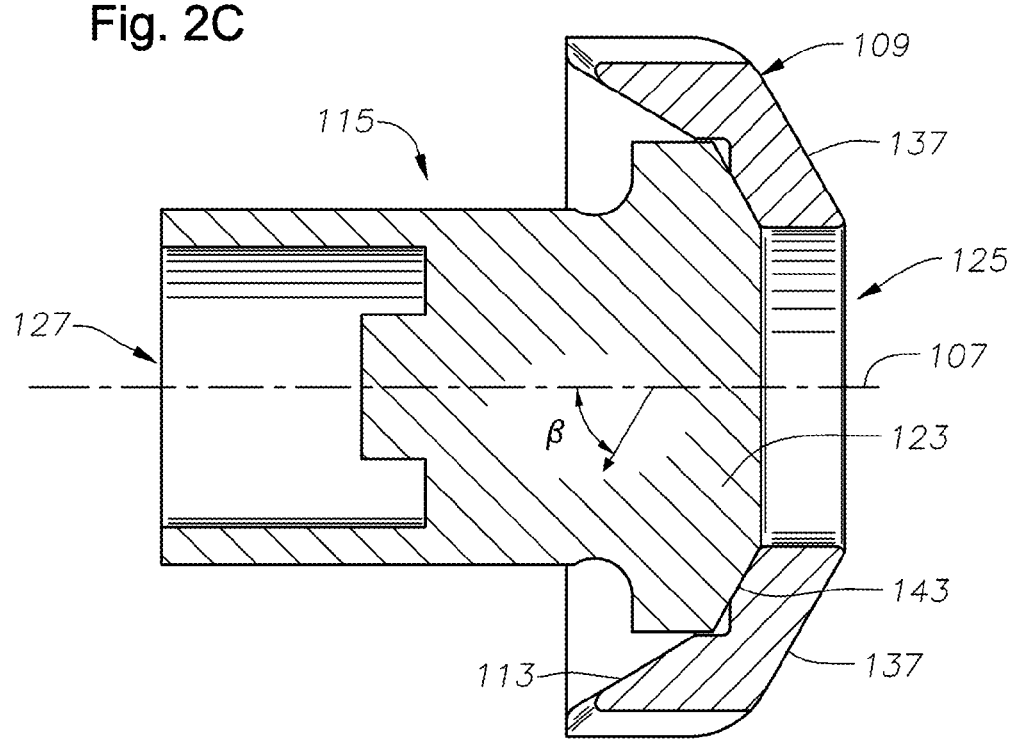
FIG. 2c shows a close-up cross-section of the poppet in its closed position relative to the seat of the valve.
Figure 3:
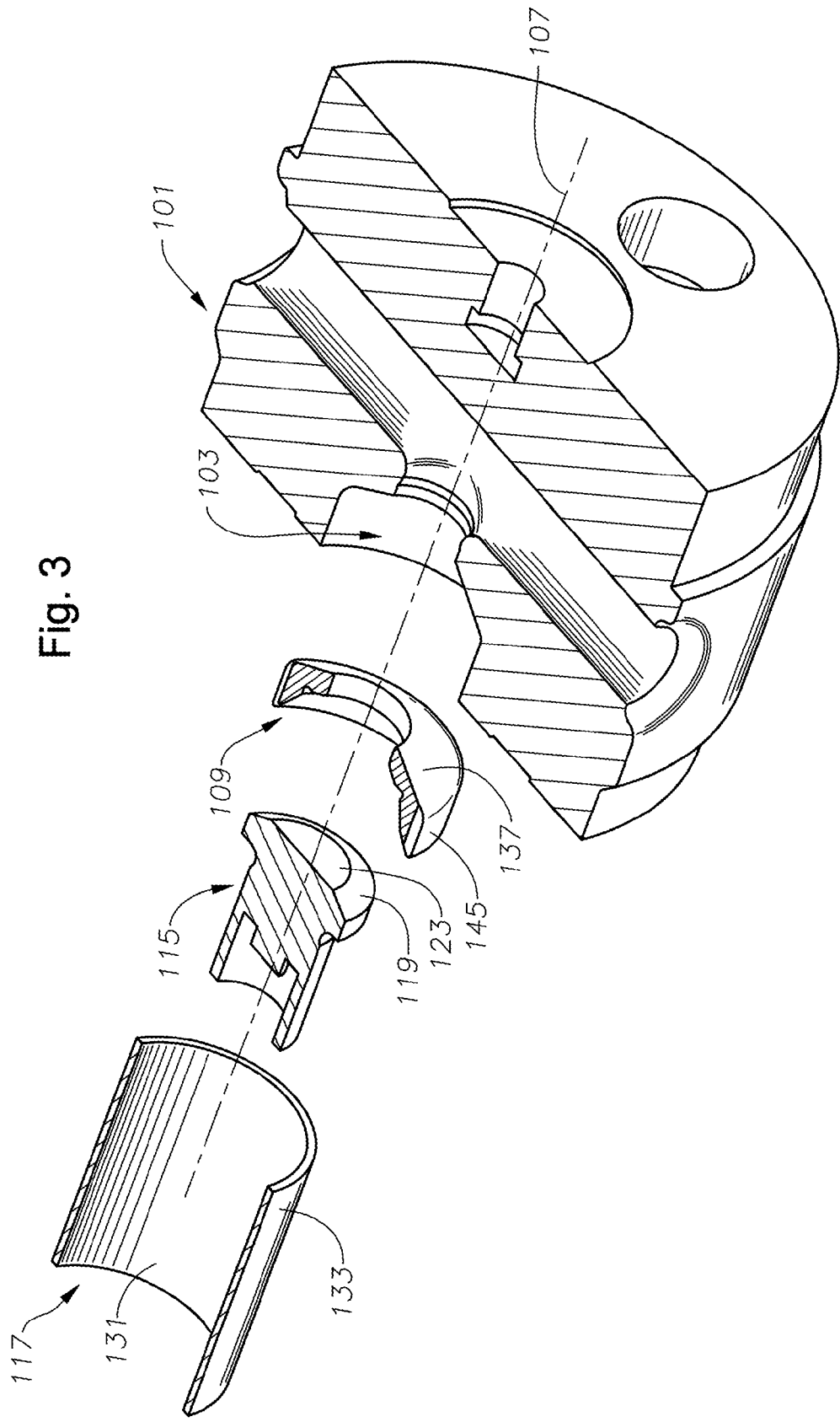
FIG. 3 shows another cross-section of one embodiment of the inventive valve from the upstream perspective, the individual parts separated to show details.
Figure 5:
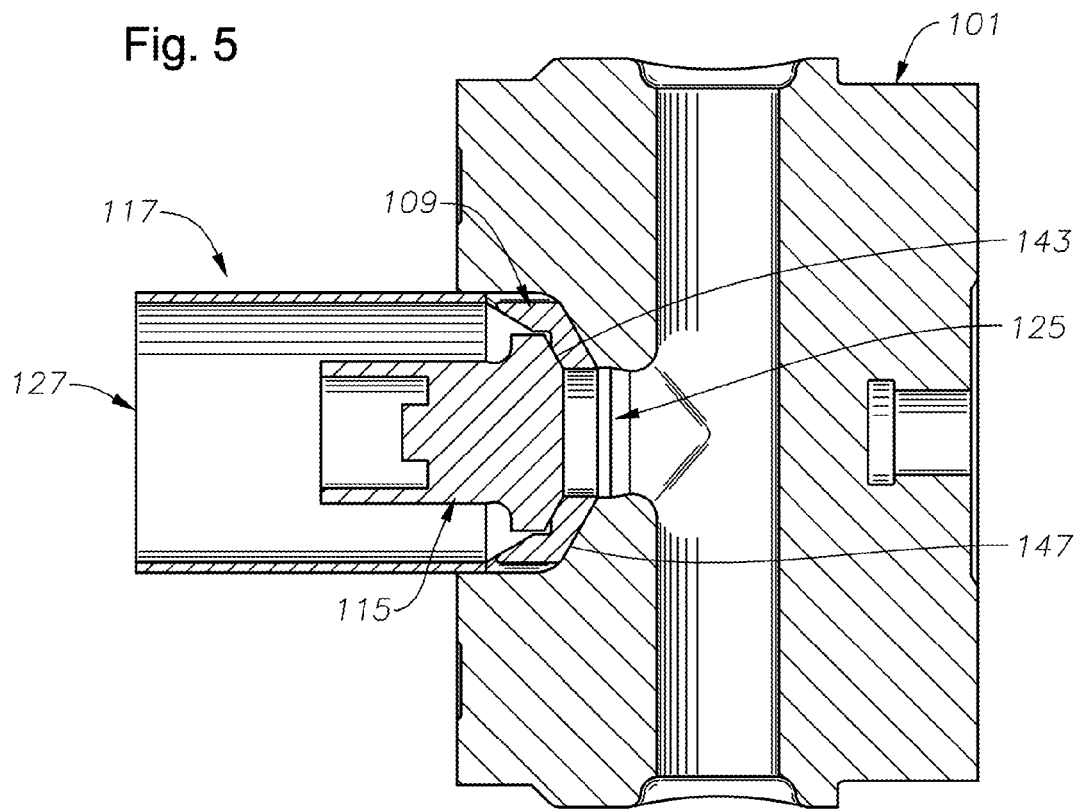
FIG. 5 shows a cross-section of one embodiment of the inventive valve in the closed position and showing how the components fit together.

Referring still to the Figures, fluid, supercritical fluid in one embodiment, flows down a valve channel as in flow A and into the valve chamber 103 through orifice 135 as in flow C. The flow of fluid then enters the poppet valve chamber 103 at the upstream end 125 (FIGS. 1 and 2b) of the poppet valve chamber 103, and through the chamber when the valve is in the open position (as in FIG. 2b) and out of the poppet valve chamber 103 as fluid flow B out the downstream end 127 of the poppet valve chamber. The seat 109 is generally an axisymmetric shape that fits at the upstream end 125 of poppet valve chamber 103 of a valve body 101. The seat 109 has an outer-seat surface 137 in one embodiment that contacts the mating valve inside surface 105 at the upstream end 125 of the poppet valve chamber 103. The outer-seat surface 137 (FIG. 3) may be lapped to the inside valve surface 105 to enhance a metal to metal seal at the valve-seat interface 147 (FIG. 5). The poppet 115 located downstream of the seat 109 has a poppet head 123 that acts against the replaceable seat 109 to create the poppet-seat interface 143 (FIG. 2c). In one embodiment, the seat 109 has a seat sealing surface 111 that mates against at least the poppet sealing surface 119 to form a poppet-seat interface 143 when the poppet valve is in the closed position (FIG. 2c). These surfaces 111 and 119, creating the poppet-seat interface 143 when the poppet valve is in the closed position, form an angle β (FIG. 2) with respect to the axis 107 within the range of from 20 to 90° in one embodiment, and from 25 to 85° in another embodiment, and from 30 to 80° to the axis in one embodiment, and from 35 to 75° in another embodiment, and from 45 to 75° in yet another embodiment, wherein any upper limit can be combined with any lower limit to create a desirable range.

Further, a valve-seat interface 147 (FIG. 5) is located at the outer-seat surface 137 contacting the valve inside surface 105, the valve-seat interface 147 also being at an angle β', wherein β' may be the same or different angle from β. The angle β' with respect to the axis 107 is within the range of from 20 to 90° in one embodiment, and from 20 to 85° in another embodiment, and from 30 to 80° to the axis in one embodiment, and from 35 to 75° in another embodiment, and from 45 to 75° in yet another embodiment. The valve-seat interface 147 serves as a sealing interface to prevent higher pressure fluid located at the downstream end of the valve and in the chamber from communicating to the upstream end of the valve 125 when the valve is in the closed position. The force created from the differential pressure downstream and upstream of the valve while the valve is in the closed position acts against the seat 109 which reinforces the fluid sealing properties of the valve-seat interface 147. This force creates stress in the valve body 101. This stress is distributed from the valve surface 105 into the valve body 101. The valve-seat interface 147 can be optimized by adjustments in the angle β' of the conical inside valve surface 105 and the surface 137 thereby preventing undesirable stress concentrations within the valve body 101 in the vicinity of the seat.

The seat 109 is held in position at least in part by a compression sleeve 117 (FIGS. 1, 3 and 5) that contacts a shoulder 139 (FIG. 4) on the downstream end of the seat 109. The upstream end of the compression sleeve 117 contacts this shoulder 139 adjacent to the outside diameter of the seat 109. The compression force of the compression sleeve 117 is achieved, in one embodiment, by an axial interference fit within the poppet valve chamber 103, thereby achieving a force acting parallel to axis 107 to hold the seat in position.

As mentioned, there is a flow restriction zone 121 created between the poppet head 123 and the seat 109 at least adjacent to the surface 113 in one embodiment, and also adjacent to second poppet surface 149 in another embodiment. This flow restriction zone 121 is, in one aspect of the invention, advantageous to the proper function of the poppet 115 performance. The flow restriction zone 121 is such that the greatest restriction of fluid through the valve (smallest cross section area of flow) occurs at this flow restriction zone 121, between at least the flow restriction surface 113 and the poppet sealing surface 119 during most of the poppet range of travel. In a particular embodiment, the flow restriction zone 121 is also adjacent to second poppet surface 149 (FIG. 2a). A flow restriction surface 113, which is substantially conical in one embodiment of the seat 109, defines the outer profile of flow restriction zone 121 while the edge (or edge feature) defined by the intersection of poppet sealing surface 119 and second poppet surface 149 of the poppet head 123 defines in part the inner profile of flow restriction zone 121. The shape of the flow restriction surface 113 is such that as the poppet 115 travels to the fully open position (FIG. 2a), the open area increases and, thus, the restriction of the radial flow restriction zone 121 is reduced. The opposite occurs as the poppet 115 travels to the fully closed position (FIG. 2c). The cutaway view of one embodiment of the valve in FIG. 2b highlights how the fluid flow C channels into the valve chamber 103 through orifice 135 and around the poppet head 123 and out through the downstream end 127.

The geometry, or profile, of the poppet 115, and in particular, the poppet head 123 can take on various forms, as long as there is at least one surface that sealingly mates with the inside surface of the seat such as to create a seal when the poppet is in the closed position, not allowing the flow C to enter the valve chamber; and also, the profile can take any form as long as a flow restriction zone is created. Likewise, the inside surface of the seat (comprising surfaces 111 and 113 in the embodiment in the Figures) can also take on any geometry, as long as there is at least one mating surface that creates a seal with at least a part of the surface of the poppet; and also, the profile can take any form as long as a flow restriction zone is created.

More particularly, the poppet-seat interface 143, formed by the sealing contact of at least surfaces 111 and 119, is not limited to the geometry shown in the Figures, but can take on any geometry. For example, the seat sealing surface 111 might be curved in a concave direction, while poppet sealing surface 119 could be correspondingly convex. Also, surfaces 111 and 113 together could be continuous, excluding the channel 129, or could together form different geometries. The channel, if present, can also take on various forms such as having a deeper profile, or wider, or narrower. Also, the flow restriction surface 113 could take on a curved or other more complex profile.

Note that for simplicity of illustration, the valve body as shown (e.g., FIG. 5) in the illustrated embodiment is without any form or material which would encompass or surround the full length of the compression sleeve 117. The valve body 101 would, in a preferable embodiment, extend outward to encompass at least the full length of the compression sleeve 117. Thus, the inside wall of the poppet valve chamber 103 extends, in a preferred embodiment, the length of the compression sleeve 117, intimately contacting the outer sleeve surface 133 (FIG. 3), while the inside sleeve surface 131 makes up the full length of the poppet valve chamber 103.

In certain embodiments, the seat 109 possesses a pressure balancing means 141, shown more fully in one embodiment in FIG. 4, to communicate fluid between at least the outside seat surface 145 of the seat 109 to the inside surface made up at least by seat sealing surface 111 and flow restriction surface 113, and in one embodiment the groove 129 there between, of the seat 109 to prevent unwanted differential pressure forces acting upon the seat. The pressure balancing means 141 may be in the form of a groove in one embodiment, or a hole running through the thickness of seat 109 in another embodiment, or other shape.

The valves described herein are particularly useful in compressors, "hypercompressors" in a particular embodiment, which is a compressor that maintains a fluid from at least 80 or 100 MPa or more of pressure. Typically, the inventive valves reside in the final stage hypercompressor that supplies a high pressure polyethylene ("HP-PE") reactor with the process fluid. For example, one reactor line hypercompressor may have 4, 6, 8, or 10 cylinders in the final stage with these valve assemblies, and each valve assembly may have two poppet valves, so there are total of at least 8 to 20 poppet valves. In the HP-PE process of this invention the temperature of the medium within which the polymerization reaction occurs is at least 140° C., and preferably above 160° C., and may range up to just below the decomposition temperature of polyethylene product in another embodiment; and ranges to a temperature within the range of from 140 to 350° C. in yet another embodiment; and within the range from 180 to 280° C. in yet another embodiment. In one embodiment, the polymerization is completed at a pressure above 50 MPa, and at above a pressure of 100 MPa in another embodiment, and at a pressure of within the range from 50 to 350 MPa, and at a pressure within the range from 80 to 150 MPa in yet another embodiment.

One embodiment of the high-pressure polyolefin polymerization process is described here. In its most preferred embodiments, the high-pressure polymerization process is carried out as a continuous process. As such, the polymerization medium (containing polymer product and catalyst) is removed from the reaction zone where fresh catalyst (e.g., radical generator, or organometallic compound, metallic coordination compound, or combination thereof), monomer and, and when present, a diluent, are added to the reaction zone in corresponding amounts to maintain an equilibrium of mass within the reaction zone. In the continuous process, unreacted monomer and/or diluent are recovered from the polymer product by flash evaporation, conditioned for reuse and recycled to the reaction zone as at least a part of the makeup amounts of monomer and/or diluent feed to the reaction zone. To save cost of recompression of recovered monomer it is preferably flashed away from the product polymer by only a slight reduction of pressure, or, alternatively with no reduction of pressure by the addition of moderate amounts of additional heat to the medium during the flash recovery operation. When a polymerization diluent is used as the medium, the bulk of unreacted monomer is preferably recovered separately from the diluent by a first high pressure flashing operation and the diluent, together with small amounts of unreacted monomer, is next recovered by total pressure reduction on the medium.

As indicated, the polymerization of monomers occurs in a medium which carries the catalyst into contact with the monomer and absorbs the heat of reaction liberated by monomer polymerization. The polymerization medium may comprise a normally fluid inert hydrocarbon compound or the medium may consist essentially of a normally gaseous monomer which under application of pressure is preferably maintained in a supercritical fluid state within the reaction zone. The hypercompressors maintain the supercritical state by delivering the reactor feed gas in a continuous mode from the primary compression and recycle systems of a HP-PE unit. One embodiment of the valves of the invention act within the hypercompressor during the reciprocating motion of the hypercompressor to direct the flow of fluid into the cylinder from the fluid inlet during the suction stroke and out of the cylinder to the outlet during the discharge stroke without incurring backflow of fluid during operation. Thus, the valves work as suction and discharge check valves within the hypercompressor cylinders.

Generally, when a normally fluid inert hydrocarbon is used to provide the reaction medium, the polymerization reaction may be carried out at lower pressures than required when the polymerization medium consists essentially of a fluidized monomer, ethylene in a particular embodiment. When present, inert hydrocarbon compounds which may be used as a polymerization diluent to provide the polymerization medium include aliphatic, cycloaliphatic, and aromatic hydrocarbons having from six to twenty carbon atoms.

More preferably, the process is practiced with a polymerization medium which consists essentially of one or more monomers—one or more $C_2$ to $C_{10}$ olefins in one embodiment, and ethylene and an optional $C_2$ to $C_{10}$ α-olefin in a particular embodiment—maintained by added pressure in a supercritical fluid state. The four or more hypercompressors maintain the monomers (and, if present, diluent) in the supercritical state, preferably at a pressure of at least 100 MPa, and at least 130 MPa in another embodiment. Although this entails a greater degree of initial monomer compression and compression cost, this method of practice is preferred because no portion of the reactor volume is occupied by an inert diluent compound. Thus, with the same reactor, a greater level of throughput of polymer production can be realized than when an inert diluent is used as the polymerization medium.

Thus, one aspect of the invention is directed to a high pressure polymerization process comprising channeling a fluid, where a valve body having a poppet valve chamber is provided; providing a seat having a seat sealing surface, the seat located within the poppet valve chamber; and providing a poppet having a poppet sealing surface, the poppet being located within the poppet valve chamber and capable of making contact with the seat sealing surface; and further comprising a flow restriction means to provide a local high velocity zone at least between the poppet sealing surface and the seat sealing surface. Olefin monomers, primarily ethylene in one embodiment, are supplied to the hypercompressor under pressure such that the monomers are in a supercritical state, the supercritical fluid is further pressurized in the hypercompressor(s) and the supercritical fluid passes through the valve body as through path A and into orifice 135 as through path C, lifting the poppet from the seat during each stroke of the reciprocating compressor cylinder, whereby the supercritical monomers can then pass as through path B out the downstream end 127 of the poppet valve chamber 103.

A particular aspect of the invention is directed to a valve comprising a valve body having a poppet valve chamber; a seat having a seat inside surface 151, the seat located coaxially within the poppet valve chamber; and a poppet having a poppet head surface 151, the poppet being located coaxially within the poppet valve chamber and capable of making contact with the seat inside surface; and further comprising a velocity increasing means to provide a local high velocity zone at least adjacent to the poppet head surface 151 and the seat sealing surface. In one embodiment, the velocity increasing means is provided by the geometry of the poppet and seat; such geometry being defined by the cross-sectional profile of the poppet head surface and seal inside surface. In one embodiment, the velocity increasing means comprises a flow restriction zone defined by the profile of the seat inside surface and the profile of the poppet head surface. In a particular embodiment, a poppet-seat interface is created between the seat inside surface and the poppet head surface, the poppet-seat interface being at an angle β of from 20 to 85 or 90° to the axis. In yet another embodiment, the poppet head surface further comprises a flow restriction surface 113 and a second poppet surface 149, wherein a flow restriction zone is located at least adjacent to the flow restriction surface and the poppet sealing surface. In another embodiment, the valve has an open position and a closed position, and partially open positions in between, and wherein there is a flow restriction zone adjacent to at least the flow restriction surface except for the closed position.

In a preferable embodiment, the seat is removable from the valve body, meaning that it is not permanently fixed to the valve body but can be removed and/or replaced by a new seat or a refurbished seat. The only criteria is that conical surface 137 that creates the sealing interface 147 should be nearly the same or identical to the seat being replaced for the same valve body, as the sealing interface will be determined at least in part by the shape of the inside valve surface 105 that will typically remain fixed.

In a particular embodiment, the flow restriction zone has a flow path cross sectional area that is less than the flow path cross sectional area between the poppet sealing surface and the seat sealing surface for a given position of the poppet in an open position. This occurs in one embodiment when the poppet head surface is discontinuous such that there is an edge or "pinch point" created by the poppet head, this pinch point, and the facing seat inside surface, creates the flow restriction zone. In a more particular embodiment, the seat inside surface comprises two discontinuous surfaces—a seat sealing surface and a flow restriction surface, the flow restriction surface participating in the creation of the flow restriction zone as the poppet travels to the fully open position. In yet a more particular embodiment, the geometry of the poppet head (which can comprise one surface, or two or more surfaces at different angles from one another) and the seat inside surface (which can comprise one surface, or two or more surfaces at different angles from one another) is such that the fluid-velocity enhancement of the flow restriction zone is stronger when the poppet is near the closed position, and small or negligible when the poppet is in the fully open position.

EXAMPLE

Figure 6:
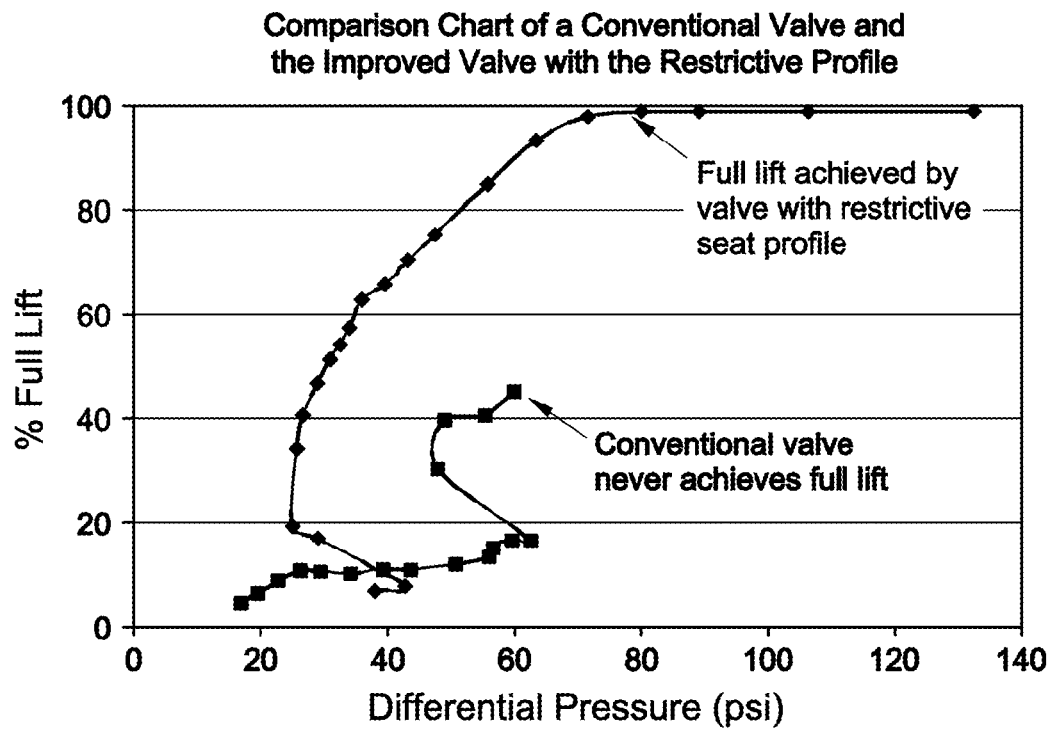
FIG. 6 is a graphical representation of the lift (mm) of the poppet in a test valve as a function of differential pressure across the valve.
Figure 7:
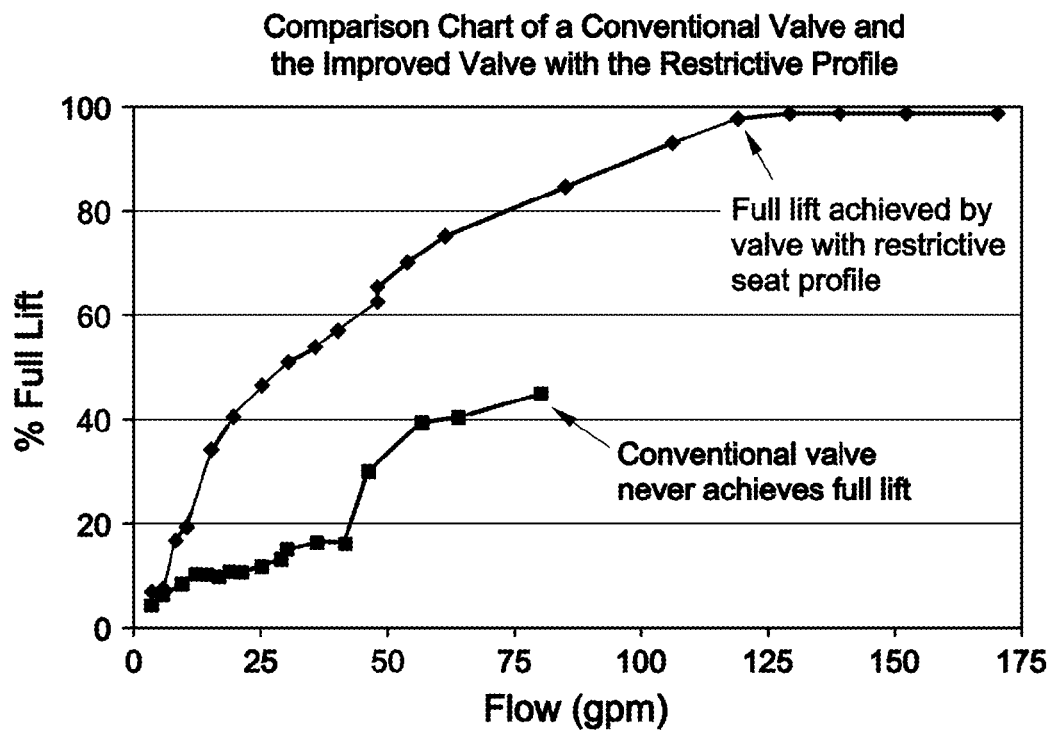
FIG. 7 is a graphical representation of the lift (mm) of the poppet in a test valve as a function of fluid flow across the valve.

A test of an embodiment of the valve of the invention was performed in the laboratory, the results of which are shown in FIGS. 6 and 7. A simulated compressor head and valve body was constructed, having a means for measuring fluid volume flow rate, pressure upstream and downstream of the valve and the poppet position. Water was used as the operating fluid as its properties are close to supercritical ethylene (essentially incompressible, that is $\rho/\rho_0$ nearly equal to 1).

Having described aspects of the invention in some detail, in a first numbered embodiment:
(1) is a valve comprising:
   (a) a valve body having a poppet valve chamber with an axis running there through;
   (b) a seat having a seat sealing surface, and a outer-seat surface, the seat located axially within the poppet valve chamber; and
   (c) a poppet having a poppet sealing surface, the poppet being located axially within the poppet valve chamber;
   wherein a poppet-seat interface is created between the seat sealing surface and the poppet sealing surface, the poppet-seat interface being at an angle β of from 20 to 85° to the axis.
2. The valve of numbered embodiment 1, wherein a valve-seat interface is located between the outer-seat surface and the valve inside surface, the valve-seat interface being at an angle β' of from 20 to 90° to the axis.
3. The valve of numbered embodiments 1 and 2, wherein the poppet sealing surface further comprises a flow restriction surface that is distinct from the poppet sealing surface, wherein a flow restriction zone is located adjacent to the flow restriction surface and the seat sealing surface.
4. The valve of any of the preceding numbered embodiments, wherein the valve has an open position and a closed position, and partially open positions in between, and wherein there is a flow restriction zone adjacent to at least the flow restriction surface except for the closed position.
5. The valve of any of the preceding numbered embodiments, wherein the flow restriction zone has a flow path cross sectional area that is less than the flow path cross sectional area between the poppet sealing surface and the seat sealing surface for a given position of the poppet in an open position.
6. The valve of any of the preceding numbered embodiments, wherein the seat also possesses seat outside seat surface adjacent to the inside wall of the poppet valve chamber.
7. The valve of any of the preceding numbered embodiments, wherein the seat possesses a pressure balancing means, fluidly communicating between the surfaces and the poppet valve chamber.
8. The valve of any of the preceding numbered embodiments, wherein the seat is removably contacting the inside valve inside surface.

9. The valve of any of the preceding numbered embodiments, wherein the seat possesses an outer-seat surface that removably contacts the inside valve inside surface.

10. The valve of any of the preceding numbered embodiments, further comprising a compression sleeve compressively contained within the poppet valve chamber and adjacent to the seat.

11. The valve of any of the preceding numbered embodiments, wherein the valve operates under a pressure differential in the closed position of at least 80 MPa.

12. A compressor comprising the valve of any of the preceding numbered embodiments.

13. A process of channeling a fluid of any of the preceding numbered embodiments, comprising:
   (a) providing the valve body having a poppet valve chamber with an axis running there through;
   (b) providing the seat having a seat sealing surface, the seat located co-axially within the poppet valve chamber; and
   (c) providing the poppet having a poppet sealing surface, the poppet being located axially within the poppet valve chamber;
   wherein the valve has an open position and a closed position, and wherein a flow restriction zone is created adjacent to at least the poppet sealing surface in the range of poppet travel between the closed position and the open position such that fluid flowing through the valve chamber and past the poppet in the open position creates a local high fluid velocity zone.

14. The process of numbered embodiment 13, wherein the fluid is a supercritical fluid.

15. The process of numbered embodiments 13 and 14, wherein the flow restriction zone has a flow path cross sectional area that is less than the flow path cross sectional area between the poppet sealing surface and the seat sealing surface.

16. The process of numbered embodiments 13 through 15, wherein the flow restriction zone is located radially out from the poppet.

17. An olefin polymerization process comprising providing one or more compressors comprising one or more valves of any of the preceding numbered embodiments comprising:
   (a) a valve body having a poppet valve chamber with an axis running there through;
   (b) a seat having a seat sealing surface, the seat located co-axially within the poppet valve chamber; and
   (c) a poppet having a poppet sealing surface, the poppet being located axially within the poppet valve chamber;
   wherein the valve has an open position and a closed position, and wherein a flow restriction zone is created adjacent to at least the poppet sealing surface in the range of poppet travel between the closed position and the open position such that fluid olefin flowing through the valve chamber and past the poppet in the open position creates a local high fluid velocity zone.

18. The process of any of the preceding numbered embodiments, wherein the seat is removable.

In another aspect is the use of a valve in a polyolefin polymerization reactor, the valve comprising (a) a valve body having a poppet valve chamber and an axis running there through; (b) a seat having a seat sealing surface, the seat located within the poppet valve chamber; and (c) a poppet having a poppet sealing surface, the poppet being located within the poppet valve chamber and capable of making contact with the seat sealing surface; and (d) a velocity increasing means to provide a local high velocity zone adjacent to the at least one poppet sealing surface and the at least one seat sealing surface.

In another aspect is the use of a valve in a polyolefin polymerization reactor, the valve comprising (a) a valve body having a poppet valve chamber with an axis running there through; (b) a seat having a seat sealing surface, and a outer-seat surface, the seat located axially within the poppet valve chamber; and (c) a poppet having a poppet sealing surface, the poppet being located axially within the poppet valve chamber; wherein a poppet-seat interface is created between at least a portion of the seat sealing surface and at least a portion of the poppet sealing surface, the poppet-seat interface being at an angle β of from 20 to 90° to the axis.

What is claimed is:

1. A compressor check valve comprising:
   (a) a valve body having a poppet valve chamber with an axis running there through and a valve inside surface;
   (b) a removable seat having a seat sealing surface, a flow restriction surface and an outer-seat surface, the seat located axially within the poppet valve chamber; and
   (c) a poppet having a poppet sealing surface and a second poppet surface each having a different angle relative to the axis, and wherein the poppet sealing surface and the second poppet surface form an intersection, and wherein the location of the poppet is dependent on the flow rate of a fluid through the valve, the poppet being located axially within the poppet valve chamber;
   wherein the intersection and the flow restriction surface are operable to form a flow restriction zone for fluid flowing therebetween, wherein a poppet-seat interface is created between the seat sealing surface and the poppet sealing surface, the poppet-seat interface being at an angle β of from 20° to 90° to the axis, and wherein the compressor check valve further comprises a compression sleeve compressively contained within the poppet valve chamber and adjacent to the seat.

2. The valve of claim 1, wherein a valve-seat interface is located between the outer-seat surface and the valve inside surface, the valve-seat interface being at an angle β' of from 20° to 90° to the axis.

3. The valve of claim 2, wherein the seat is operable to removably contact the valve inside surface.

4. The valve of claim 2, wherein the seat possesses an outer-seat surface that is operable to removably contact the valve inside surface.

5. The valve of claim 1, wherein the valve has an open position and a closed position, and partially open positions in between, and the flow restriction zone is adjacent to at least the flow restriction surface except for the closed position.

6. The valve of claim 5, wherein the flow restriction zone has a flow path cross sectional area that is less than a flow path cross sectional area between the poppet sealing surface and the seat sealing surface for a given position of the poppet in an open position.

7. The valve of claim 1, wherein the seat also possesses an outside seat surface adjacent to the inside wall of the poppet valve chamber.

8. The valve of claim 7, wherein the seat possesses a pressure balancing means, fluidly communicating between the outer-seat surface and an inside surface made by the seat sealing surface and the flow restriction surface and the poppet valve chamber.

9. The valve of claim 1, wherein the valve operates under a pressure differential in the closed position of at least 80 MPa.

10. The valve of claim 1, wherein the valve is a hypercompressor check valve.

* * * * *